July 6, 1948.                S. G. ISSERSTEDT                2,444,510
                                 TOASTER
Filed Oct. 5, 1944
                                                          2 Sheets-Sheet 2
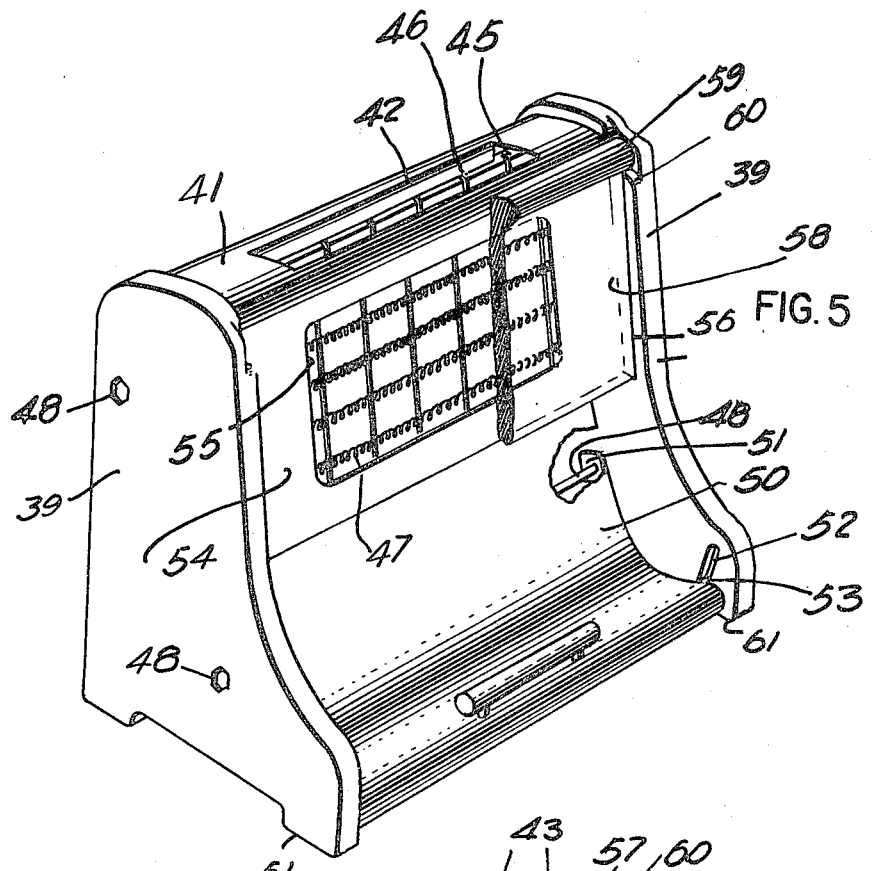
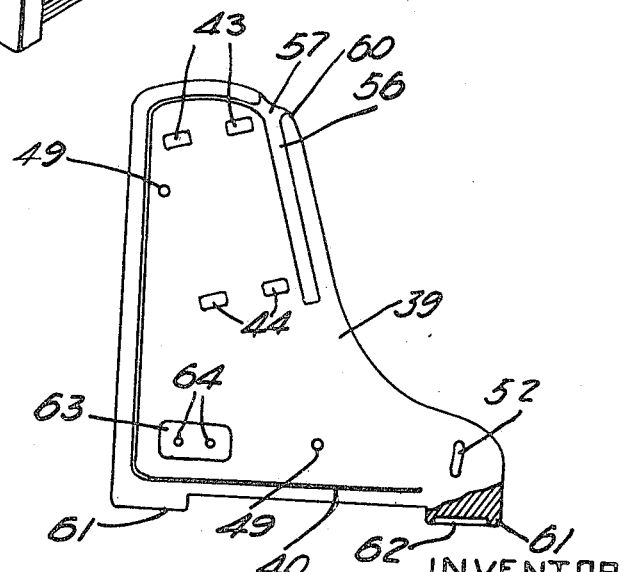
INVENTOR
S. G. ISSERSTEDT
BY
ATTYS

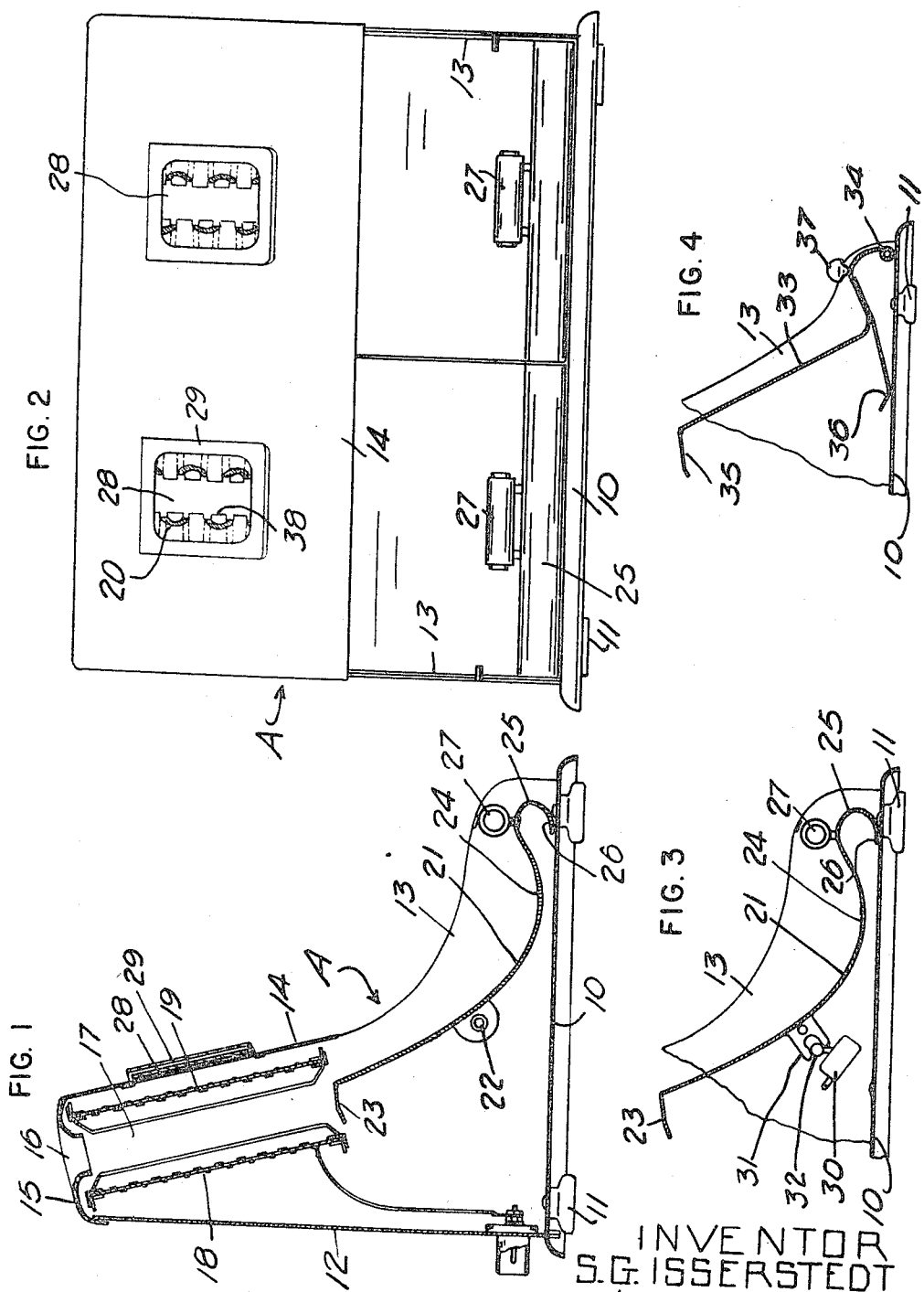

Patented July 6, 1948

2,444,510

UNITED STATES PATENT OFFICE 2,444,510

TOASTER

Siegfried Gordon Isserstedt, Toronto, Ontario, Canada

Application October 5, 1944, Serial No. 557,279

11 Claims. (Cl. 99—338)

This invention relates to improvements in toasters.

The present invention is primarily concerned with toasters of the type which are designed to toast both sides of the bread at the same time and therefore have a receiving pocket for the bread which is disposed between two parallel spaced apart toasting elements. In toasters of this kind, difficulty is often experienced in extracting the toasted bread from the receiving pocket. In some cases a means is provided for projecting the toasted bread upwardly from the receiving pocket after it has been toasted. In many instances, the toasted bread will catch in this upward movement and it is necessary to release it and extract it. In other cases, it is necessary to pull out or swing out a special carrier which extracts the toast from the receiving pocket. In this case, it is then necessary to extract the toast with the fingers from the carrier and often the fingers come in contact with hot metal parts of the carrier. In both cases, it is usually necessary to grasp the hot toast, either in order to clear the passage to the receiving pocket, or to clear the carrier, so that it may be used immediately again. These are some of the disadvantages of this type of toaster which can be readily avoided and which are completely avoided by the present invention.

It is therefore an object of the present invention to provide a simple and efficient toaster structure through which the toast may be easily discharged and without the necessity of an extracting operation and the grasping of hot toast by the operator.

A further object of the invention is to provide a toaster of this character wherein the toast is automatically discharged by gravity and is received in a convenient holder.

A further object of the present invention is to provide a toaster in which the toast may be retained in close proximity to the heat after it is discharged in order to retain the toast warm until it is ready for use.

A still further object of the present invention is to provide a toaster structure wherein the toast confined within the receiving pocket during toasting may be viewed to determine whether or not it has been toasted to a sufficient degree.

A still further object of the invention is to provide a toaster wherein the means for discharging the toast from the toaster may automatically function to switch off the toaster.

A still further object of the present invention is to provide a toaster having these and other advantages and yet which may be constructed economically by reason of its general simplicity.

With these and other objects in view, the invention generally comprises a toaster having elements for toasting in proximity to which a piece of bread is positioned for toasting and a movable receiver having means for retaining the bread in position during toasting, the receiver being capable of temporary displacement to discharge the toast by gravity and to receive the toast as it is discharged.

The invention will be clearly understood by reference to the following detailed specification taken in conjunction with the accompanying drawings.

In the drawings:

Figure 1 is a transverse section taken through a form of toaster according to the present invention and illustrating novel features of construction.

Figure 2 is a side elevation of Figure 1.

Figure 3 is a fragmentary sectional detail of an alternative form of construction.

Figure 4 is a fragmentary sectional detail of a still further modified form of construction.

Figure 5 is a perspective view partly in section of an alternative form of construction, and Figure 6 is a side elevation partly in section of the inside surface of one of the end members of the toaster shown in Figure 5.

Referring to the drawings, A indicates a toaster as a whole made up of a general framework including a suitable base 10 supported on feet 11, a back plate 12, end walls or plates 13 and a partial front plate 14. This framework may be so constructed that the back plate 12 and end plates 13 are integrally connected and bent to the shape required, and this structure may then be fastened to the base plate 10. The partial front plate 14 carries the top cap plate 15 preferably formed integrally therewith and secured to the back plate 12 and the end plates 13.

The cap plate, where employed, is formed with a slot 16 of a width and length designed to permit the passage of a piece of bread therethrough into a receiving pocket 17. This latter is bounded on each side by the toasting elements 18 and 19 formed in a generally conventional manner having dielectric carrying bodies, such as mica, serrated at opposed edges and designed to carry the resistance wire 20.

A salient feature of the present invention resides in the receiver 21 which in the form shown in Figure 1 constitutes a curved plate which is pivotally mounted intermediate its end to the end walls 13 of the toaster frame and at its upper end is formed with an offset lip 23 which is disposed to underlie the receiving pocket 17 and therefore forms a base for the latter. Consequently, when the bread is passed through the slot 16 into the receiving pocket 17 its lower edge comes to rest on lip 23. In this manner therefore the toast is readily held within the receiving pocket during the toasting operation.

The upper portion of the plate 21 is substantially straight and follows substantially the axial line of the receiving pocket 17. At its lower end it is relatively sharply curved, as at 24, and its extremity is given a reverse curve, as at 25, to form a firm but slightly resilient supporting foot 26. Towards its lower extremity and on its upper side it is preferably provided with an operating handle 27 which preferably has linear extent and also forms a stop member for stopping and positioning the toast in the receiver as it is discharged from the receiving pocket 17 of the toaster.

The pivotal mounting 22 of the receiver 21 is preferably located beyond the centre of gravity of the receiver, such that the weight of the lower extremity will always cause the receiver to assume the position shown in Figure 1. Moreover, the operating handle 27 is designed to add additional weight to this end of the receiver so that when a piece of toast is received by the receiver the latter will maintain the position shown in Figure 1 even under the extra weight of the toast.

The operation of the toaster will be obvious. When a piece of toast has been completely toasted and the operator raises the lower end of the receiver by grasping the handle 27, the lip 23 which forms the base for the receiving pocket 17 will be caused to move to the left, as viewed in Figure 1, as the receiver pivots on its pivot point 22. Therefore, the normal base has been removed from the receiving pocket 17 and the piece of toast will drop by gravity and slide along the upper surface of the receiver until it comes to rest by engaging the handle 27 or other suitable stop means that might be provided. Therefore, upon release of the operating handle 27 the receiver will swing back to its normal position, shown in Figure 1, holding the toast in convenient location for removal.

It will be appreciated that when the lip 23 is moved to clear the lower end of the receiving pocket 17 that the toast will freely drop as there are no obstructions of any kind to retain it. Moreover, it is not necessary for the operator to grasp the toast in any way so that the toast is discharged automatically to a convenient location ready for use at any selected time. Furthermore, if the toast is left to remain in the receiver while another piece of toast is being toasted, it will be obvious that the second piece of toast can be discharged to lie on top of the first piece, merely by swinging the receiver to an extent to clear the edge of the first piece of toast from the lower open end of the receiving pocket 17. Finally, it will be appreciated that if the toast is left to remain in the receiver for a short period of time it will be held in proximity to the heat and therefore will be retained in warm condition until it is taken from the receiver.

The partial front plate 14 covers the heating element but terminates in spaced relation to the base 10 to an extent sufficient to permit the clear exposure of a piece of toast in the receiver 21. Moreover, the front plate 14 is preferably provided with the windows 28 which may be covered with a heat resisting, transparent material, such as Pyrex, and through which the toast carried in the receiving pocket 17 may be viewed, to determine the degree of toasting. These windows may be formed in any convenient way, one simple formation being shown in Figure 1 wherein the transparent window pieces are slid through the open end of the window framework 29.

In the alternative form of structure shown in Figure 3, a toggle switch 30 is included designed to be operated by the movement of the receiver 21. A convenient switch actuating means may employ the bifurcated actuating member 21 designed to engage the ball end of the switch arm 32. Thus, when the receiver is swung about its pivotal point 22 to discharge a piece of toast from the toaster, the toggle switch is operated to cut off the current supply, and thus, if only one piece of toast is required, then the toaster will be automatically shut off. However, if it is desired to toast further, then the handle of the receiver 21 is pressed back to normal position, shown in Figures 1 and 3, and the toggle switch 30 will be actuated to the "on" position. In this form of construction, therefore, the lower end of the receiver will be disposed in a raised position when the toasting operation has been completed and it is only necessary to press down on the handle 27 when it is desired again to bring the toasting elements 18 and 19 into operation. Such a construction is convenient since it provides a very conveniently operated switching arrangement and avoids the necessity of pulling out the toasting plug or handling hot parts of the toaster.

A further alternative form of construction is shown in Figure 4, wherein the receiver 33 is pivotally mounted, as at 34, at its lower end and is maintained in normal position, positioning the lip 35 below the end of the receiving pocket 17 of the toaster, by means of a simple leaf spring 36 which engages the base 10. A suitable actuating member 37 is carried on the receiving member 33 and it is only necessary to depress the member 37 which will cause the receiver to move downwardly against the pressure of the spring 36, thus to move the lip 35 from obstructing the lower end of the receiving pocket 17 to permit the toast to discharge into the receiver in a manner similarly to that previously described. Release of pressure on the member 37 will then cause the receiver 33 to assume its normal position, as shown in Figure 4, to which it is urged by the spring 36.

It is apparent of course, having regard to Figure 2, that the toaster may be produced as a structure designed to toast a plurality of pieces of bread at the same time by employing an elongated receiving pocket or a plurality of such receiving pockets and the necessary number of toasting elements, which preferably are so constructed that the resistance wire will merely loop over the projecting teeth 38 of the element carrier to dispose the resistance wire along one side only thereof.

In a further alternative form of construction, shown in Figures 5 and 6, the structure incorporates the end member 39 shaped to meet requirements, which end members preferably are formed from a suitable ceramic material, bakelite, or other heat resisting material which is grooved on its inside surface, surface, as at 40, around a substantial part of the periphery, namely, along the bottom, back and top, to form a receiving channel for the casing or body structure of the toaster, namely, the bottom, back and top, which may be formed from one continuous piece of material bent to correspond to the outline produced by the groove 40. This body member forming these walls is indicated by the numeral 41 and, formed in its top, is a recess or slot 42 of a width and length sufficient to permit the passage of a piece of bread therethrough.

The inner surface of the end members 39 may also be formed with the opposed pairs of recesses 43 and 44 to receive the longitudinal cross members 45 which carry the substantially vertically disposed wire guides 46 defining the receiving pocket of the toaster, while the end members, for carrying the elements 47, may extend between upper and lower cross bars 45. Thus, so far as these general parts of structure are concerned, an essentially simplified structure is produced, the assembly of which only requires the insertion of the one piece body casing 41 into the groove 40 of one member, the insertion of the cross bars 45 with their connected structure and elements into the recesses 43 and 44 and the application of the other end member 39 to the opposite ends of these parts, whereupon the whole structure may be fastened by two bolt rods 48 passing through the orifices 49 in the end members 39. Moreover, the receiving tray 50 of substantially similar construction to that previously described and functioning in the same manner may be pivotally mounted on the bolt rod 48, such as by means of the orificed lug as shown in Figure 5, while the movement of the receiver or tray 50 may be limited by the provision of a suitable slightly arcuate slot 52 in the lower portion of and, on the inner surface of, the end members 39 by providing a suitable laterally projecting lug 53 at each end of the receiver 50, as shown in Figure 5.

The partial front plate 54 formed on the body 41 is preferably formed with a window opening 55, while the inner surface of the end members 39 is provided in each case with a downwardly extending groove 56 which is open at the top, as at 57, and designed to receive when the toaster is assembled the sliding window covering 58 which may be formed of pyrex or any suitable transparent heat-resisting material. This window element is preferably provided with a marginal protruding rib 59 at its upper end forming a shoulder designed to engage the shoulder portion 60 formed on each end member 39. Consequently, by sliding the window element 59 into the opposed grooves 56 of the end members the window opening 55 is conveniently covered and the operator is given a very clear view of the bread being toasted so as to determine when it has been sufficiently toasted to be discharged.

The end members 39 are so cast or moulded as to provide the protruding feet 61 which are suitably recessed, as at 62, to receive suitable pads such as felt pads or the like. Moreover, one of the end members is preferably formed with a reinforced portion 63 which may be thicker and is provided with the holes 64, to receive the normally projecting metal blades or contacts for the plug of the conducting cord, which pass through these holes in the dielectric material and are fastened in a suitable manner.

In general, the toaster of the present invention provides a structure having a toast receiver in its lower extremities accessible through the open bottom portion of the side of the toaster which is defined by the lower edge of the partial front plate and the base of the toaster designed to receive toast discharged by gravity from the receiving pocket of the toaster upon displacing the bottom of said pocket. Moreover, it will be appreciated that since the toasting elements are disposed in the upper part of the toaster and spaced substantially from the base upon which the toaster may be mounted, the extreme heat of the elements will not be concentrated in any sense on such base, so that extra insulating or heat-shielding material would not normally be required in the construction.

It will be appreciated, of course, that the base for the toast receiving pocket, i. e., the lip 23 does not require to extend the full length of the receiver but may constitute merely a projection or projections sufficient to support the material within the pocket. Accordingly, therefore, the term base in relation to the lip 23 should be construed as a support of suitable kind such as to retain the material in the pocket.

From the foregoing, it is clear that the toaster is of simple construction, made up of few parts and therefore can be produced economically while providing the various advantages set forth.

What I claim as my invention is:

1. A toaster comprising a framework open along one side adjacent to its base to form an accessible toast receiving cavity, a pocket above said receiver designed to contain the material to be toasted, said pocket being open at its top to receive said material and open at its bottom to discharge toasted material, said bottom opening being in communication with said cavity, electrical toasting elements in proximity to said pocket for toasting the material introduced thereto, a toast receiver swingably mounted on said framework and having a portion designed to form a base for the bottom opening of said toasting pocket when in a normal position, said receiver being swingable to a position within said cavity to move said base member away from the bottom opening to said pocket, said receiver being disposed directly below the bottom opening to said pocket, said material being dischargeable by gravity through the open bottom of said pocket into said receiver and being accessible for removal through the open side of said toaster.

2. A toaster as claimed in claim 1, in which means is provided for returning the receiver and said base to original position after it has been swung from said latter position.

3. A toaster as claimed in claim 1, in which the toast receiver comprises a metal plate which substantially closes the opening to the cavity when said plate is disposed in normal position, said base being formed by offsetting the upper edge of said plate to form a laterally projecting lip capable of substantially closing the bottom opening to the pocket and supporting material therewithin to be toasted.

4. A toaster as claimed in claim 1, in which the toast receiver comprises a metal plate which substantially closes the opening to the cavity when said plate is disposed in normal position, said base being formed by offsetting the upper edge of said plate to form a laterally projecting lip capable of substantially closing the bottom opening to the pocket and supporting material therewithin to be toasted and gravity means for returning said plate to original position after it has been swung from such position.

5. A toaster as claimed in claim 1, in which the toast receiver comprises a metal plate which substantially closes the opening to the cavity when said plate is disposed in normal position, said base being formed by offsetting the upper edge of said plate to form a laterally projecting lip capable of substantially closing the bottom opening to the pocket and supporting material therewithin to be toasted and gravity means for returning said plate to original position after it has been swung from such position, and spring means for returning the plate to original position after it has been swung from such position.

6. A toaster as claimed in claim 1, in which the toast receiver comprises a metal plate which substantially closes the opening to the cavity when said plate is disposed in normal position, said base being formed by offsetting the upper edge of said plate to form a laterally projecting lip capable of substantially closing the bottom opening to the pocket and supporting material therewithin to be toasted and handle means for swinging said receiver and said connected base from original position to toast receiving position, said handle means being positioned to form a stop member to engage the toast as it discharges into the receiver.

7. A toaster including a framework and electrical toasting elements comprising a receiving pocket disposed in the upper portion of the framework designed to discharge toasted material downwardly, said pocket being open at its top and at its bottom, a movable receiver in the bottom of said framework having a projection normally disposed to underlie the bottom opening to said pocket and support the material in a position within the pocket to be toasted, said projection being displaced from its material supporting position below said bottom opening by moving said receiver to a position to receive the toasted material disengaged by said projection.

8. A toaster including a framework and electrical toasting elements for toasting purposes comprising a toast receiver swingably mounted on said framework below said elements and having a portion at its upper end designed to form a base for supporting the material to be toasted in proximity to said toasting elements when in a normal position and swingable to cause said base portion to move in an arc substantially equal to the thickness of said material being toasted to displace said base from said normal position supporting the material to be toasted and cause the said material to drop by gravity into said receiver.

9. A toaster as claimed in claim 8, in which means is provided for returning said receiver and said base to normal position with said base again disposed in position to support further material to be toasted in proximity to the electrical elements.

10. A toaster as claimed in claim 8, in which a switch is included in conjunction with the framework and designed for operative connection in the circuit normally supplying the electrical elements, said switch being employed to establish or disestablish the circuit to said electrical elements and cooperative means in connection with said swingable receiver for operating the switch to the "off" position when said receiver is displaced from normal position and to the "on" position when said receiver is in normal position.

11. A toaster comprising a framework open along one side adjacent to its base to form a toast receiver, a pocket above said receiver designed to contain the material to be toasted, said pocket being open at its top and at its bottom, toasting elements in proximity to said pocket for toasting the material introduced thereto, a base member normally disposed below the open bottom of said pocket to retain said material in toasting position, said base member being displaceable to discharge the toasted material by gravity into said receiver, said receiver taking the form of a tiltable plate, the upper end of which carries the displaceable base member, said plate being tiltable to displace the base member from its position below the open bottom of the pocket and being designed to receive the toasted material.

SIEGFRIED GORDON ISSERSTEDT.

REFERENCES CITED

The following references are of record in the file of this patent:

UNITED STATES PATENTS

| Number | Name | Date |
| --- | --- | --- |
| 1,640,716 | Mulder | Aug. 30, 1927 |
| 1,731,402 | Thornton | Oct. 15, 1929 |
| 1,769,973 | Wells | July 8, 1930 |
| 1,807,312 | Henley | May 26, 1931 |
| 1,836,538 | Lofgren et al. | Dec. 15, 1931 |
| 1,852,398 | Bersted | Apr. 5, 1932 |
| 1,939,247 | Avery et al. | Dec. 12, 1933 |
| 1,955,026 | Savage | Apr. 17, 1934 |
| 2,005,635 | Randolph | June 18, 1935 |
| 2,140,158 | Knapp | Dec. 13, 1938 |